(12) United States Patent
Li

(10) Patent No.: US 11,339,984 B2
(45) Date of Patent: May 24, 2022

(54) HUMIDIFIER

(71) Applicant: Haisong Li, Chongzuo (CN)

(72) Inventor: Haisong Li, Chongzuo (CN)

(73) Assignees: Haisong Li, Chongzuo (CN); Haiyang Huang, Meizhou (CN)

( * ) Notice: Subject to any disclaimer, the term of this patent is extended or adjusted under 35 U.S.C. 154(b) by 33 days.

(21) Appl. No.: 17/105,604

(22) Filed: Nov. 26, 2020

(65) Prior Publication Data
US 2021/0156577 A1    May 27, 2021

(30) Foreign Application Priority Data

Nov. 27, 2019   (CN) .............................. 201922076034

(51) Int. Cl.
| | |
|---|---|
| *B01F 23/23* | (2022.01) |
| *F24F 6/00* | (2006.01) |
| *F24F 6/14* | (2006.01) |
| *C02F 1/32* | (2006.01) |
| *F24F 3/16* | (2021.01) |
| *B01F 23/213* | (2022.01) |
| *F24F 6/02* | (2006.01) |

(52) U.S. Cl.
CPC ............ *F24F 6/14* (2013.01); *B01F 23/2133* (2022.01); *C02F 1/325* (2013.01); *F24F 3/16* (2013.01); *F24F 6/02* (2013.01); *C02F 2303/04* (2013.01); *F24F 2006/008* (2013.01); *F24F 2006/143* (2013.01)

(58) Field of Classification Search
CPC .......... F24F 6/02; F24F 6/14; F24F 2006/008; B01F 23/2133
USPC .................................................... 261/72.1, 81
See application file for complete search history.

(56) References Cited

U.S. PATENT DOCUMENTS 6,244,576 B1 *  6/2001  Tsai ........................ F24F 6/02
                                                      261/DIG. 65

FOREIGN PATENT DOCUMENTS

JP          2009180403 A   *  8/2009

* cited by examiner

*Primary Examiner* — Robert A Hopkins
(74) *Attorney, Agent, or Firm* — Dragon Sun Law Firm, P.C; Jinggao Li, Esq.

(57) ABSTRACT

Provided is a humidifier, including a machine base, a water tank, a water suction pump, and a water inlet pipe. The machine base is located on the water tank, which includes an atomization water reservoir, a water feed base, a control base, an atomization air channel and an atomizer disposed inside. The water feed base includes a water feed opening and a first outflow opening, and the first outflow opening is in communication with the water tank; a water inlet is disposed on the atomization water reservoir, and water in the water tank will flow into the atomization water reservoir through the water inlet pipe by the water suction pump; the atomizer is in communication with the atomization water reservoir through an atomization opening disposed at the atomization water reservoir, and water vapor flows into the atomization air channel and flows to outside along the atomization air channel.

19 Claims, 9 Drawing Sheets

HUMIDIFIER

CROSS-REFERENCE TO RELATED APPLICATION

This Application claims priorities from CN Application No. CN201922076034.X, filed Nov. 27, 2019, the content of which is incorporated herein in the entirety by reference.

TECHNICAL FIELD

The present disclosure relates to the field of small electric appliances and in particular to a humidifier.

BACKGROUND

Along with improvement of living level of people, more and more people purchase and use humidifiers. Those humidifiers with a water tank below and a machine base above are preferred by more and more people due to their water adding convenience. However, the existing humidifiers are inconvenient to assemble.

SUMMARY

In order to overcome the assembly inconveniences, there is provided a humidifier.

A humidifier is provided, including a machine base, a water tank, a water suction pump, and a water inlet pipe, where the machine base is located on top of the water tank, and includes an atomization water reservoir, a water feed base, a control base, an atomization air channel and an atomizer disposed inside.

The water feed base comprises a water feed opening at top and a first outflow opening at bottom, and the first outflow opening is in communication with the water tank.

The atomization water reservoir is provided with a water inlet so that water in the water tank enters the atomization water reservoir through the water inlet pipe under the action of the water suction pump.

The atomizer is in communication with the atomization water reservoir via an atomization opening, the atomization opening is disposed at the atomization water reservoir, and water vapor generated by the atomizer enters the atomization air channel through an air inlet at the bottom of the atomization air channel and flows to outside along the atomization air channel.

Optionally, the water feed base can be loaded to the machine base and may also be unloaded from the machine base. Optionally, the water feed base is inserted into the machine base and may also be removed from the machine base.

Optionally, the water suction pump is connected to an end of the water inlet pipe, and the water suction pump is located in the water tank when the humidifier is assembled.

Optionally, the water suction pump is fixed on the machine base, one end of the water inlet pipe is connected to the water suction pump, and the other end of the water inlet pipe is protruded into the water tank.

A water feed pipe is further included. One end of the water feed pipe is connected to the water suction pump and the other end of the water feed pipe is connected to the water inlet.

Optionally, the water feed pipe and the water inlet pipe are at the same side of the water suction pump.

Optionally, the water inlet pipe includes a water suction branch pipe and a connection branch pipe, one end of the connection branch pipe is connected with the water suction pump, and the other end of the connection branch pipe is connected with the water suction branch pipe.

Optionally, the connection branch pipe and the water suction branch pipe are connected in an inserted manner.

Optionally, a water outlet in communication with the water tank is disposed on the atomization water reservoir.

Optionally, in a vertical direction, a height of the water outlet is lower than a height of the water inlet.

Optionally, a third avoiding hole and a fourth avoiding hole corresponding to the water inlet and the water outlet respectively are disposed on the machine base, the third avoiding hole is used for the water inlet pipe to pass through, and the fourth avoiding hole communicates the water outlet with the water tank.

Optionally, the water outlet is at a corner of a main base and away from the water inlet; the main base has a flow guide pipe at a bottom of the water outlet, and a side surface at an outward-facing side of a bottom end of the flow guide pipe has a second outflow opening.

Optionally, a water retaining rib is surrounded around the water outlet.

Optionally, the machine base includes a seat and a main base, and the seat is fixed at a lower portion of the main base.

The main base includes a housing and a partition plate integrally formed, and the partition plate is located in the housing and partitions the housing into upper and lower portions; the partition plate and the upper portion of the housing form the atomization water reservoir, and a reservoir bottom of the atomization water reservoir is the partition plate.

The water feed base and the control base are disposed in parallel at an upper half of the main base, the atomization air channel is located between the water feed base and the control base, and the seat is fixed at a lower half of the main base.

The partition plate and the seat have a first avoiding hole and a second avoiding hole, and the first outflow opening exactly faces the first avoiding hole and the second avoiding hole.

Optionally, the humidifier according to claim 13, the water feed base is inserted into the upper part of the main base and may also be disassembled from the upper part of the main base.

Optionally, the water inlet and the atomization opening are both at the bottom of the atomization water reservoir, and a flow guide groove is disposed between the water inlet and the atomization opening.

Optionally, in a vertical direction, the flow guide groove is inclined toward the atomization opening, and the position of the flow guide groove close to the atomization opening is presented as gradually widening in a direction toward the atomization opening.

Optionally, a high-level detector and a low-level detector are disposed in the atomization water reservoir.

Optionally, each of the high-level detector and the low-level detector is a dry reed pipe.

Optionally, a disinfection lamp is disposed at the water inlet.

Water is fed into the humidifier in a top water adding manner. The water in the water tank enters the machine base for atomization along the water inlet pipe under the drive of the water suction pump, so as to humidify external air. With the above disposal, the water suction pump is located on the machine base. When the machine base is removed, the water suction pump and the water inlet pipe may be removed together. In this way, the machine base is completely separated from the water tank so that the machine base and the water tank are independent from each other, facilitating fabrication and mounting of the humidifier.

Further, the water is added into the water tank by the water feed base. The water feed base is equivalent to a water-adding channel or a water-adding funnel penetrating through the main base and the water tank. Such a structure changes the designing idea of directly adding water to the water tank by removing the main base from the water tank in the prior art, facilitating the use of users. This water-adding structure will have better convenient effect especially in the floor type humidifiers and the industrial humidifiers.

BRIEF DESCRIPTION OF DRAWINGS

In order to clearly describe the technical solutions in the examples of the present disclosure or in the prior art, the accompanying drawings involved in the examples or the prior art will be briefly described below. Apparently, the accompanying drawings described below are merely some examples of the present disclosure and those skilled in the art may also obtain the drawings of other examples based on these drawings without paying creative work.

Figure 1:
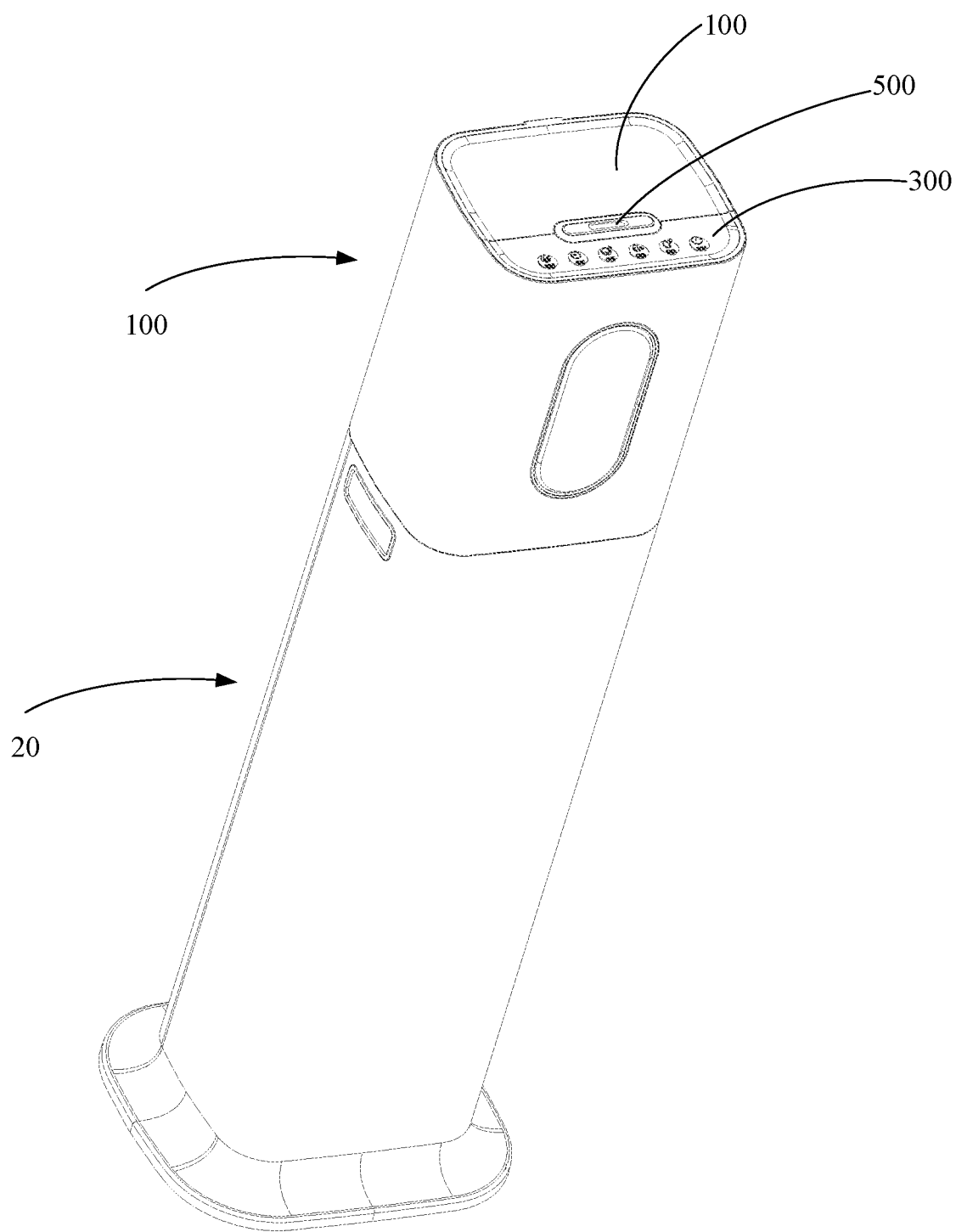
FIG. 1 is a schematic diagram of an example of a humidifier according to the present disclosure.
Figure 2:
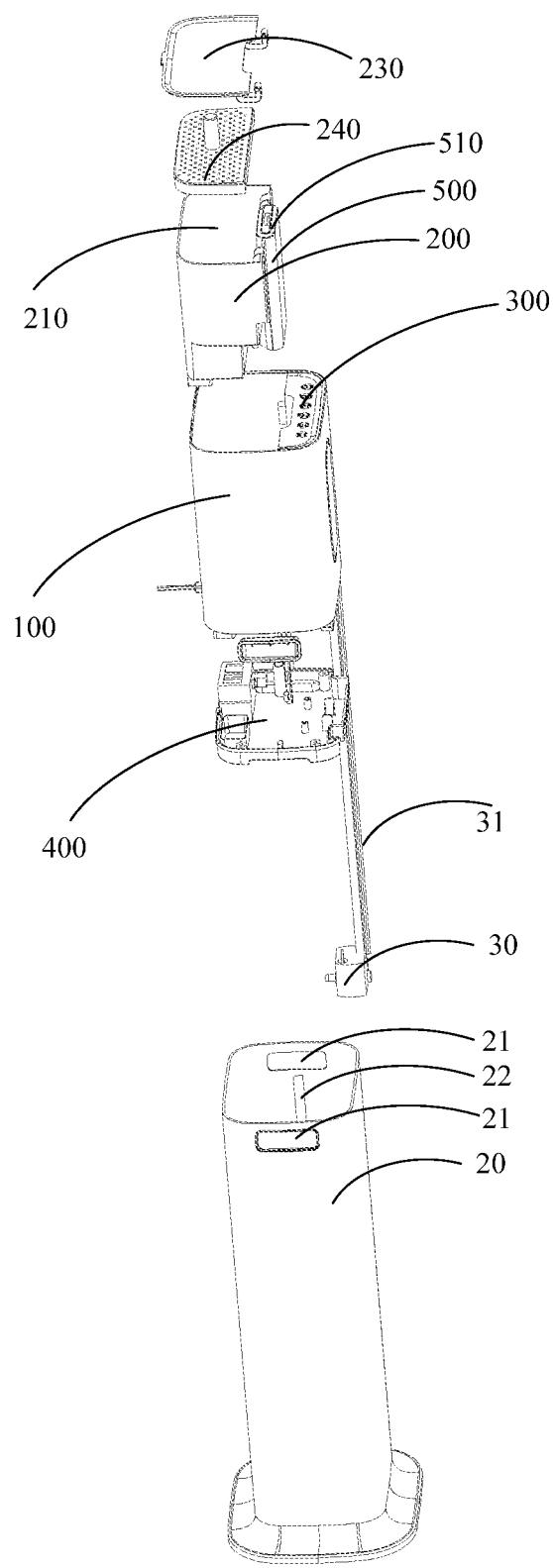
FIG. 2 is an exploded view of the humidifier in FIG. 1.
Figure 3:
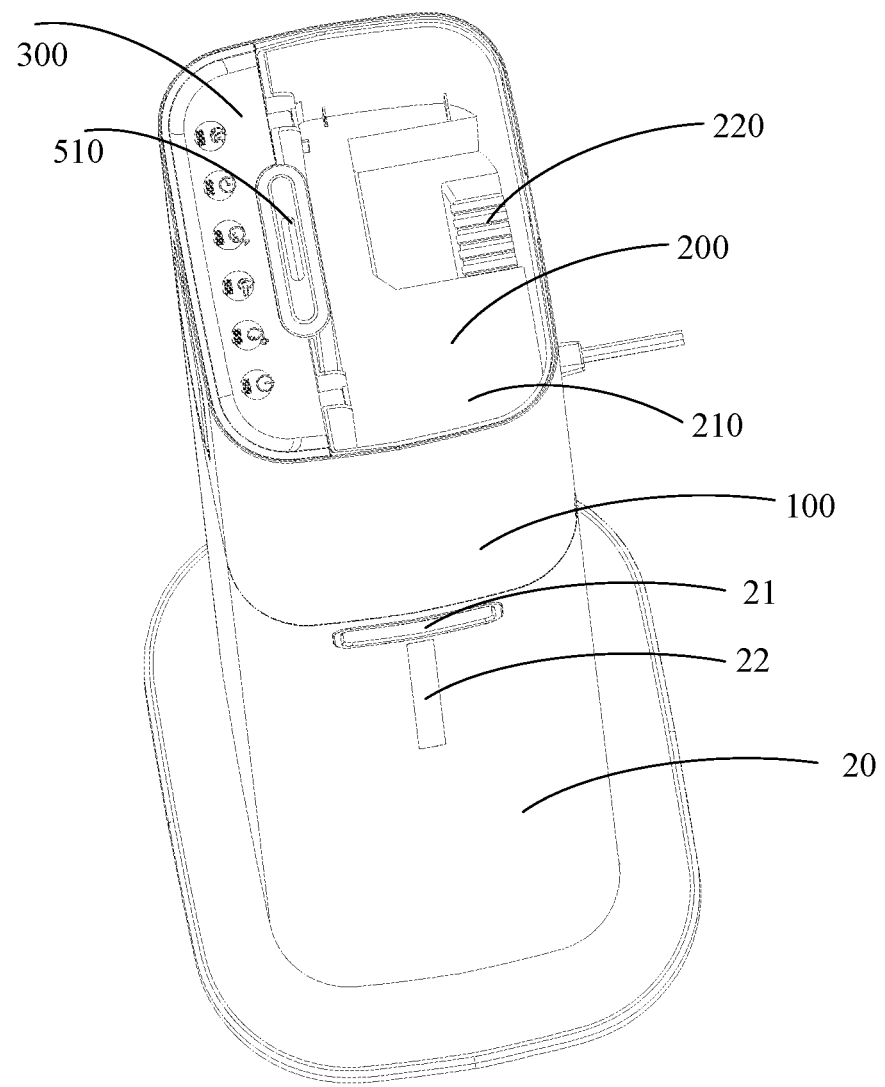
FIG. 3 is a schematic diagram of an angle of the humidifier without a cover plate in FIG. 1
Figure 4:
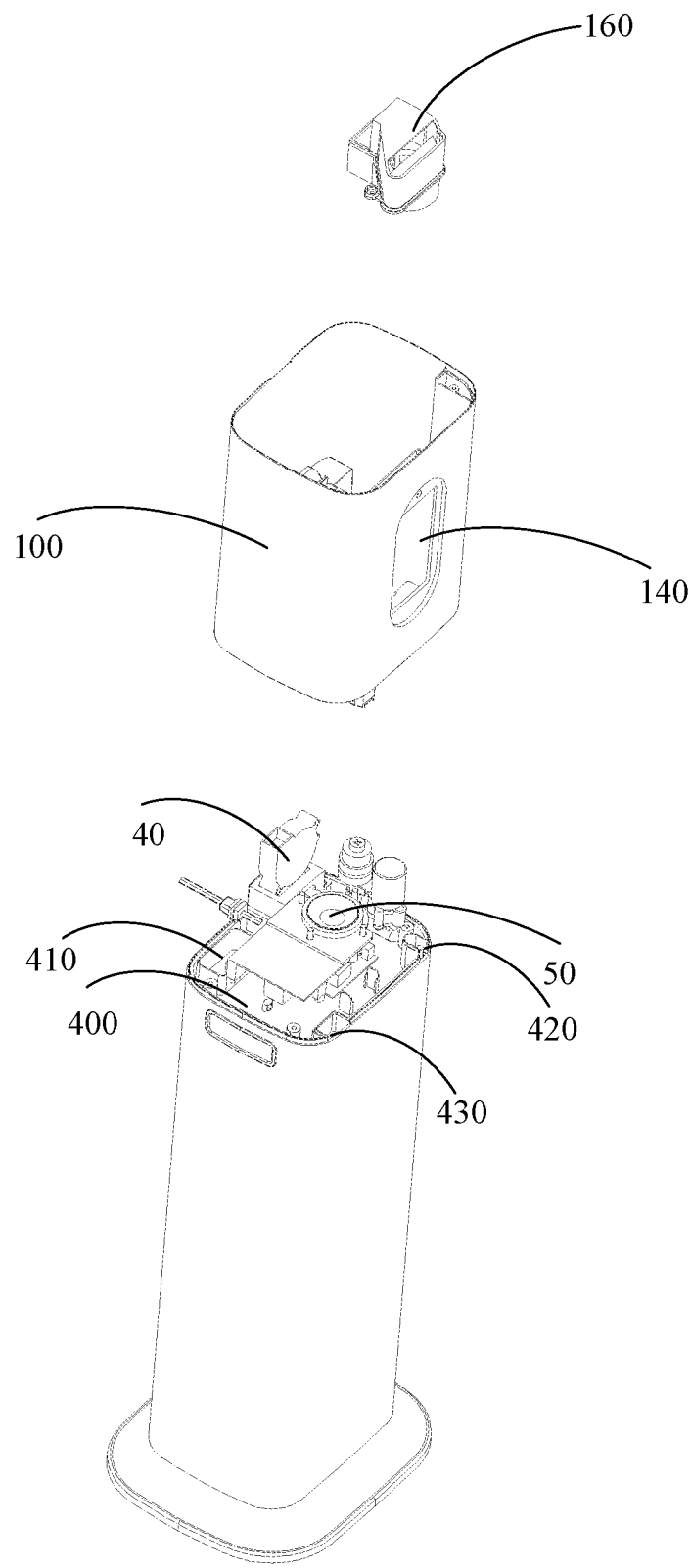
FIG. 4 is a partial exploded view of the humidifier in FIG. 1.
Figure 5:
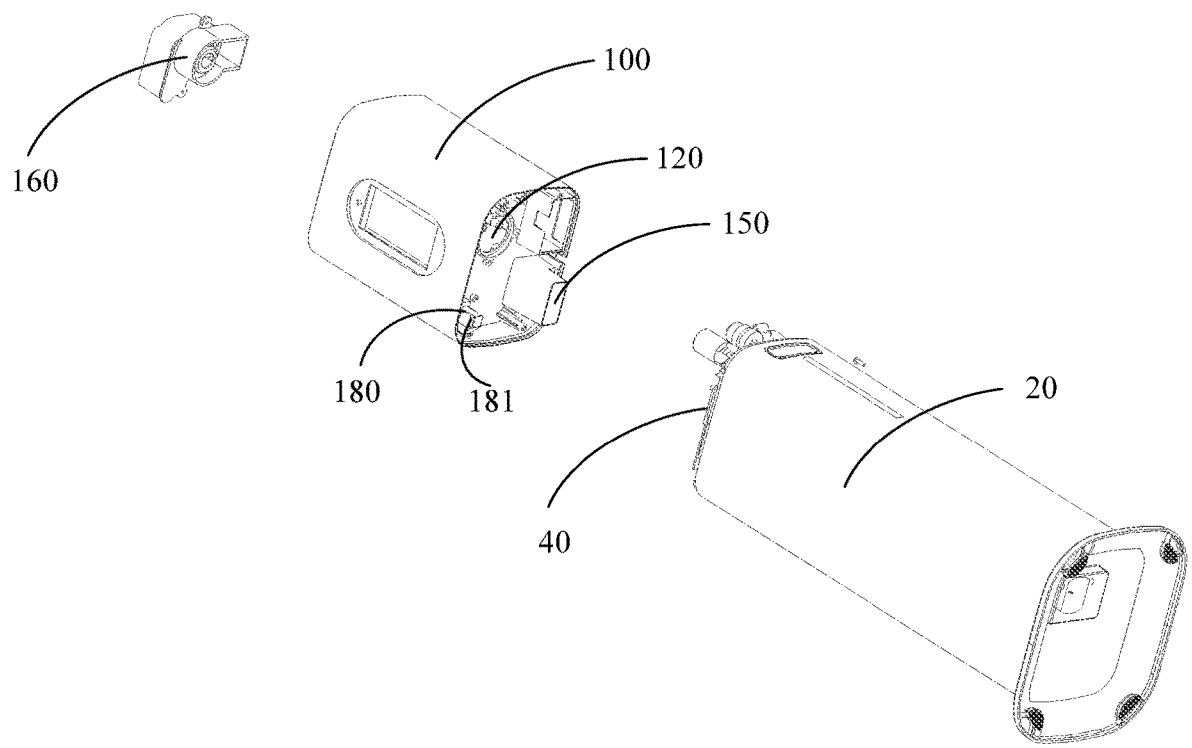
FIG. 5 is a schematic diagram of another angle of the humidifier in FIG. 6.
Figure 6:
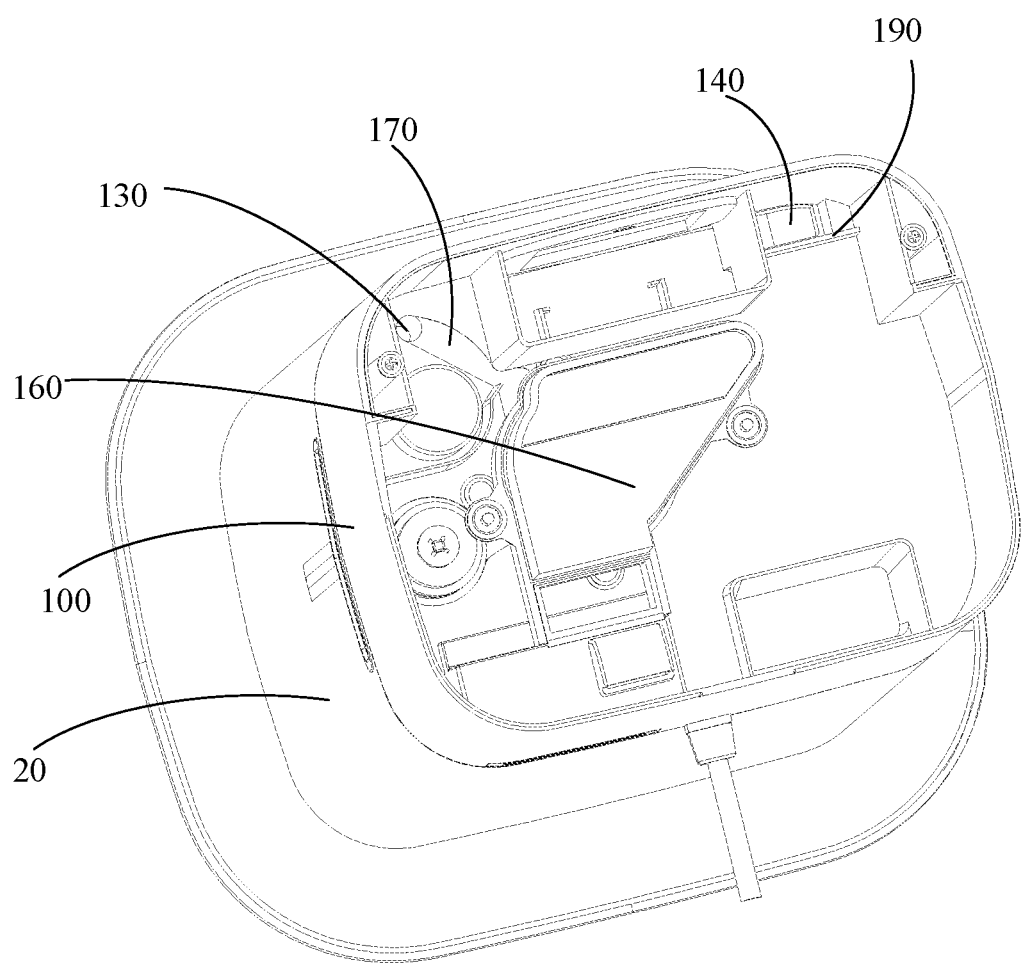
FIG. 6 is a partial schematic diagram of the humidifier in FIG. 1.
Figure 7:
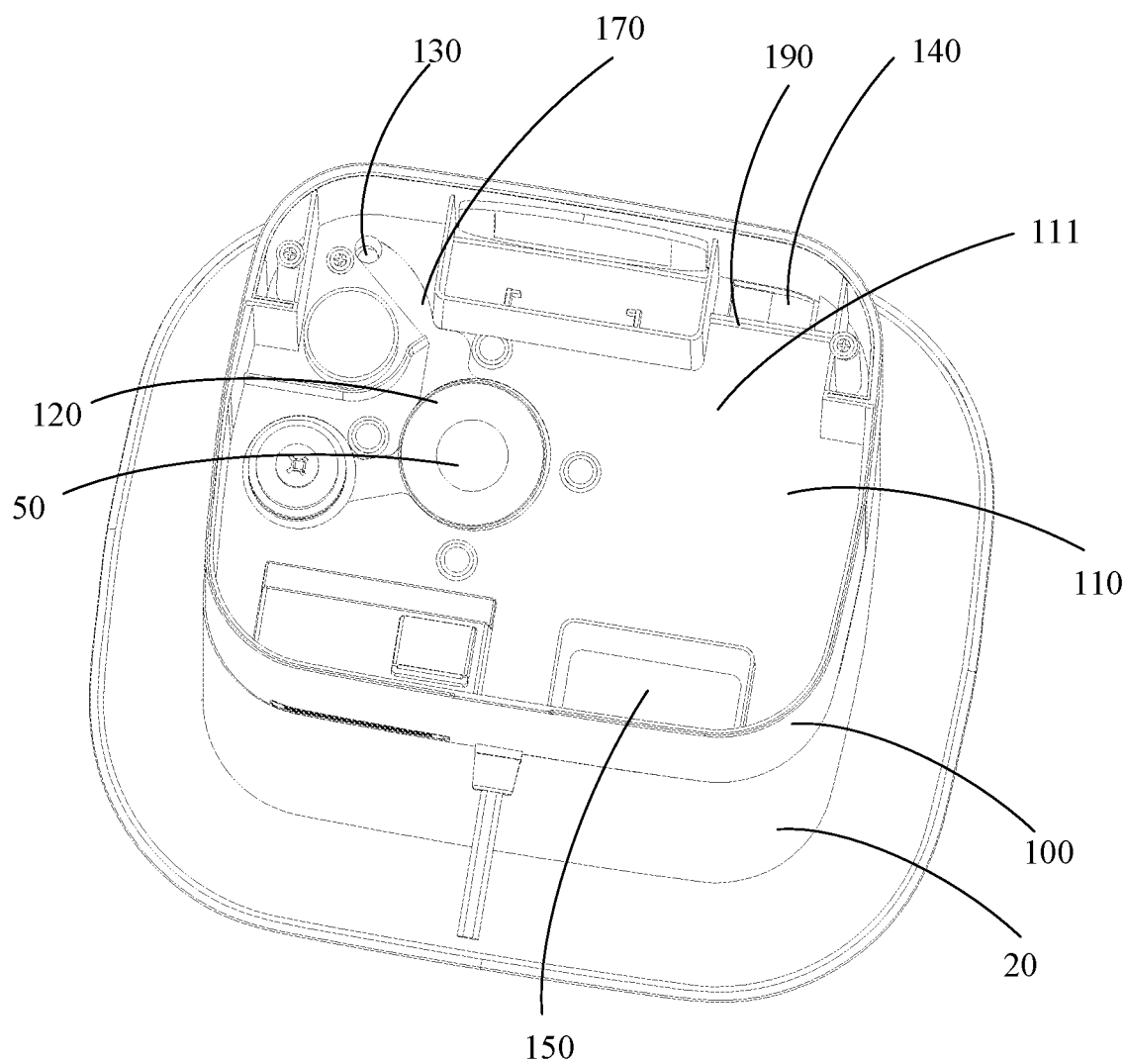
FIG. 7 is a schematic diagram of the humidifier without an air duct assembly in FIG. 6.

Numerals of drawings are described below: machine base 10, main base 100, atomization water reservoir 110, atomization opening 120, water inlet 130. water outlet 140, first avoiding hole 150, air duct assembly 160, flow guide groove 170, flow guide pipe 180, second outflow opening 181, water retaining rib 190, water feed base 200, water feed opening 210, first outflow opening 220, cover plate 230, filter 240, control base 300, seat 400, second avoiding hole 410, third avoiding hole 420, fourth avoiding hole 430, atomization air channel 500, water tank 20, hand-clasping groove 21, transparent display strip 22, water suction pump 30, water inlet pipe 31, connection branch pipe 311, water suction branch pipe 312, water feed pipe 32, fan 40, atomizer 50, high-level detector 61, low-level detector 62 and disinfection lamp 70.

DETAILED DESCRIPTION

It is noted that when an element is said to be "fixed" on another element, such element may be directly on the another element or a centering element is also present. When an element is said to be "connected" with another element, such element may be directly connected to the another element or a centering element is also present. The terms such as "vertical", "horizontal", "left", "right" and similar expressions used herein are intended only for descriptions.

Unless otherwise stated, all technical and scientific terms used herein have the same meaning as those skilled in the art generally understand. The terms used in the specification of the present disclosure are used only for describing specific examples rather than limiting the present disclosure. The terms "and/or" used herein include any or all possible combinations of one or more associated listed items.

Figure 8:
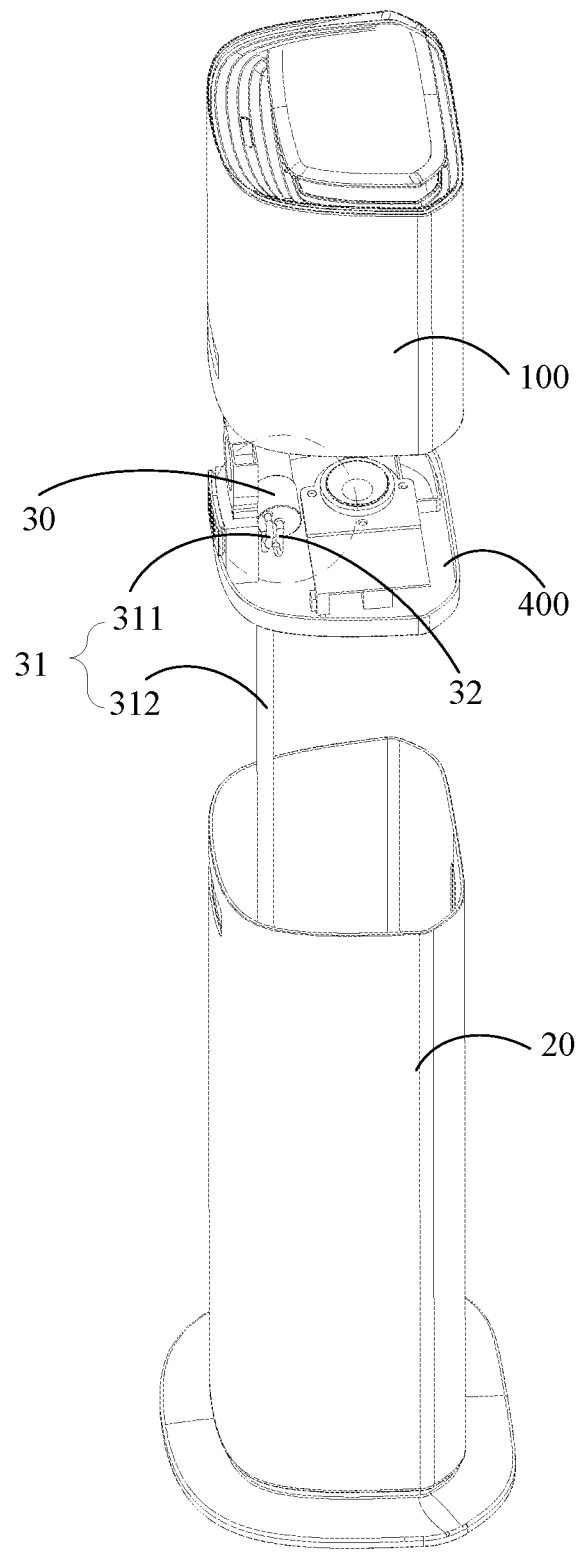
FIG. 8 is a schematic diagram of a humidifier provided with a water suction pump according to the present disclosure.

As shown in FIGS. 1 and 8, the present disclosure provides a humidifier. The humidifier includes a machine base 10, a water tank 20, a water suction pump 30 and a water inlet pipe 31. The machine base 10 is located on top of the water tank 20, the water suction pump 30 is fixed on the machine base 10, one end of the water inlet pipe 31 is connected with the water suction pipe 30 and the other end of the water inlet pipe 31 is protruded into the water tank 20.

Water is fed into the humidifier in a top water adding manner. The water in the water tank 20 enters the machine base 10 for atomization along the water inlet pipe 31 under the drive of the water suction pump 30, so as to humidify external air. With the above disposal, the water suction pump 30 is located on the machine base 10. When the machine base 10 is removed, the water suction pump 30 and the water inlet pipe 31 may be removed together. In this way, the machine base 10 is completely separated from the water tank 20 so that the machine base 10 and the water tank 20 are independent from each other, facilitating fabrication and mounting of the humidifier. It is noted that the design is not limited herein and the water inlet pipe 31 may also be integrally formed on an inner wall of the water tank 20 in other examples to effectively simplify the entire structure of the humidifier.

As shown in FIGS. 2-7, the machine base 10 includes a seat 400 and a main base 100, the seat 400 is fixed at a lower portion of the main base 100, and the water suction pump 30 is fixed on the seat 400. The main base 100 includes an atomization water reservoir 110, a water inlet 130 is disposed at the atomization water reservoir 110, and the seat 400 is fixed under the atomization water reservoir 110. A water feed pipe 32 is further included. One end of the water feed pipe 32 is connected with the water suction pump 30 and the other end of the water inlet pipe 32 is connected to the water inlet.

The machine base 10 further includes a water feed base 200, a control base 300 and an atomization air channel 500. The main base 100 includes a housing and a partition plate integrally formed. The partition plate is located in the housing and partitions the housing into upper and lower portions. The partition plate and the upper portion of the housing form the atomization water reservoir 110, and the reservoir bottom of the atomization water reservoir 110 is the partition plate. The water feed base 200 and the control base 300 are disposed in parallel in an upper half of the main base 100, and the atomization air channel is located between the water feed base 200 and the control base 300. The seat 400 is fixed at a lower half of the main base 100. Devices such as an atomizer 50, a fan 40 and a circuit board are fixed on the seat 400 and located between the partition plate and the seat 400. The water feed base 200 inserted into the upper half of the main base 100. The water feed base 200 includes a water feed opening 210 at top and a first outflow opening 220 at bottom. The partition plate and the seat 400 have a first avoiding hole 150 and a second avoiding hole 410, and the first outflow opening 220 exactly faces the first avoiding hole 150 and the second avoiding hole 410. In this case, the first outflow opening 220 is in communication with the water tank 20, thereby realizing top water adding function of the humidifier. The water is added into the water tank 20 by the water feed base 200. The water feed base 200 is equivalent to a water-adding channel or a water-adding funnel penetrating through the main base 100 and the water tank 20. Such a structure changes the designing idea of directly adding water to the water tank by removing the main base from the water tank in the prior art, facilitating the use of users. This water-adding structure will have better convenient effect especially in the floor type humidifiers and the industrial humidifiers. At the same time, a third avoiding hole 420 and a fourth avoiding hole 430 corresponding to the water inlet 130 and the water outlet 140 respectively are disposed on the seat 400. The third avoiding hole 430 is used for the water inlet pipe 31 to pass through, and the fourth avoiding hole 430 communicates the water outlet 140 with the water tank 20. The atomization opening 120 is in communication with the atomizer 50, an air inlet at the bottom of the atomization air channel 500 exactly faces the atomization opening 120, and water vapor generated by the atomizer 50 enters the atomization air channel 500 through the air inlet at the bottom of the atomization air channel 500 and flows to outside along the atomization air channel 500. An air duct assembly 160 is disposed at the bottom of channel of the atomizer 50. The water feed base 200 further includes a cover plate 230 and a filter 240.

As shown in FIG. 8, the water feed pipe 32 and the water inlet pipe 31 are at the same side of the water suction pump 30. It is equivalent to that there are water pipes on both sides of the water suction pump 30. In this solution, the water suction pump 30, the water inlet pipe 31 and the water feed pipe 32 can be arranged more orderly and concisely, facilitating use of internal space of the machine base 10.

A high-level detector 61 and a low-level detector 62 are disposed in the atomization water reservoir 110. When a water level in the atomization water reservoir 110 is high and reaches a first pre-set height, the high-level detector will be triggered. That is, when the high-level detector 61 detects that the water level reaches or exceeds the first pre-set height, the water suction pump stops working to lower the water level in the atomization water reservoir 110. When the water level in the atomization water reservoir 110 is low and reaches a second pre-set height, the low-level detector 62 will be triggered. That is, when the low-level detector 62 detects that the water level reaches or is lower than the second pre-set height, the water suction pump 30 starts working to increase the water level in the atomization water reservoir 110. With the disposal of the high-level detector 61 and the low-level detector 62, a proper water level in the atomization water reservoir 110 can be guaranteed, thereby avoiding excessively high or low water level. Further, the water suction pump 30 is prevented from continuously working, saving power consumption. In addition, the high-level detector 61 and the low-level detector 62 are a dry reed pipe, achieving better accuracy and lower costs.

Figure 9:
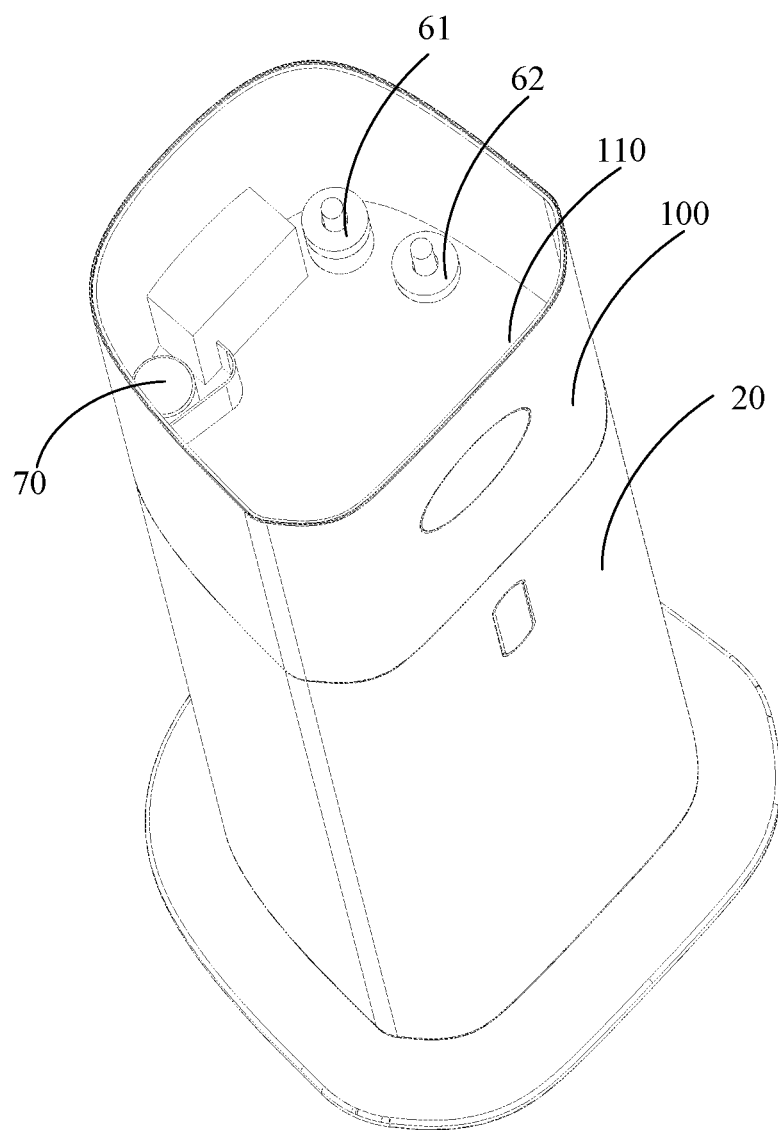
FIG. 9 is a schematic diagram of a humidifier provided with a level detector according to the present disclosure.

As shown in FIG. 9, a disinfection lamp 70 is disposed at the water inlet. The disinfection lamp 70 is an ultraviolet disinfection lamp 70 that can perform disinfection for water entering the atomization water reservoir 110.

The water inlet pipe 31 is a hose which facilitates assembly of the humidifier. The water inlet pipe 31 includes a water suction branch pipe 312 and a connection branch pipe 311. One end of the connection branch pipe 311 is connected to the water suction pump 30 and the other end of the connection branch pipe 311 is connected to the water suction branch pipe 312. The water suction branch pipe 312 protrudes to the bottom of the water tank 20, and the connection branch pipe 311 is located between the water suction pump 30 and the water suction branch pipe 312. Due to its long length, the water inlet pipe 31 is divided into the water suction branch pipe 312 and the connection branch pipe 311, so that the assembly is more convenient. The water suction branch pipe 312 and the connection branch pipe 311 are connected in an inserted manner because such inserted manner is more convenient for connection of the water suction branch pipe 312 and the connection branch pipe 311. An inlet water holding reservoir (not shown) and an atomization holding reservoir (not shown) are disposed at the bottom of the atomization water reservoir 110. The water inlet 130 is located at the bottom of the inlet water holding reservoir, the atomization opening 120 is located at the bottom of the atomization holding reservoir, and the flow guide groove 170 communicates the inlet water holding reservoir with the atomization holding reservoir. Such disposal indicates that water holding spaces are present at both ends of the flow guide groove 170. In this way, water in the flow guide groove 170 runs more smoothly.

The flow guide groove 170 has a depth of 2 mm-5 mm. At the same time, in a vertical direction, the flow guide groove is inclined toward the atomization opening 120. In this way, the water at the water inlet 130 will flow toward the atomization opening 120 more smoothly.

In a direction toward the atomization opening 120, the position of the flow guide groove 170 close to the atomization opening 120 is presented as gradually widening. Thus, water will flow into the atomization opening 120 relatively smoothly rather than too fast.

The water suction pump 30 is connected with the water inlet pipe 31. One end of the water inlet pipe 31 protrudes into the water tank 20 and the other end of the water inlet pipe 31 is in communication with the water inlet 130. Thus, water in the water tank 20 may enter the atomization water reservoir 110 through the water inlet pipe 31 under the drive of the water suction pipe 30. Under the drive of the water suction pump 30, the water in the water tank 20 will accumulate in the atomization water reservoir 110 continuously, so that the water will flow into the atomization opening 120, further drip onto the atomizer 50 for atomization and then flow out of the humidifier into the environment. At the same time, by disposing the water outlet 140, redundant water in the atomization water reservoir 110 will flow into the water tank 20 when there is too much water in the atomization water reservoir 110. The disposal of the water outlet 140 on the atomization water reservoir 110 can effectively avoid accumulation of too much water in the atomization water reservoir 110 by allowing redundant water in the atomization water reservoir 110 to flow back to the water tank 20, bringing much convenience.

In a vertical direction, i.e., in an up and down direction, the height of the water outlet 140 is lower than the height of the water inlet 130. Hence, the water in the atomization water reservoir 110 will more conveniently flow into the water outlet 140 and further flow back into the water tank 20, thereby effectively avoiding water accumulation in the atomization water reservoir 110. The water inlet 130, the water outlet 140 and the atomization opening 120 are all located at the bottom of the atomization water reservoir 110, that is, the water inlet 130, the water outlet 140 and the atomization opening 120 are located at the partition plate. In this case, the seat 400 will be manufactured more conveniently, and water will flow into and out of the atomization water reservoir 110 more conveniently and further flow into the atomizer 50 more conveniently.

The flow guide groove 170 is disposed between the water inlet 130 and the atomization opening 120. By disposing the flow guide groove, it is more convenient to allow water to flow from the water inlet 130 into the atomization opening 120. For example, when the humidifier is started, the water in the water tank 20 will be pumped by the water suction pump 30 into the atomization water reservoir 110, so that the water will flow into the atomization opening 120 conveniently through the flow guide groove 170 and further drip into the atomizer for quick atomization.

The water outlet 140 is located at a corner of the main base 100 and away from the water inlet 130. With this disposal, the water is prevented from directly flowing into the water outlet 140 after flowing into the atomization water reservoir 110 from the water inlet 130, thereby ensuring sufficient water amount in the atomization opening 120.

The main base 100 has a flow guide pipe 180 at the bottom of the water outlet 140. A second outflow opening 181 is disposed at a side surface of an outward-facing side of the bottom end of the flow guide pipe 180. Because the water outlet 140 is located at a corner of the main base 100, the flow guide pipe 180 is also located at the corner of the main base 100. Thus, the second outflow opening 181 is very close to a side wall of the water tank 20, and the water flowing out of the second outflow opening 181 may flow down along the side wall of the water tank 20, eliminating water drip noise, and ensuring safer operation.

A water retaining rib 190 is surrounded around the water outlet 140. With the water-retaining rib 190, the water flowing toward the water outlet 140 will be blocked so that the water can flow into the water outlet 140 and further back to the water tank 20 only when the water accumulates to a given extent in the atomization water reservoir 110.

The above examples are merely some examples of the present disclosure. The detailed descriptions of these examples shall not be understood as limiting of the scope of protection of the present disclosure. It should be pointed out that all variations and modifications made by those skilled in the art without departing from the concept of the present disclosure shall all fall within the scope of protection of the present disclosure. Therefore, the scope of protection of the present disclosure is indicated by the appended claims.

What is claimed is:

1. A humidifier, comprising a machine base, a water tank, a water suction pump, and a water inlet pipe, wherein the machine base is located on the water tank, and comprises an atomization water reservoir, a water feed base, a control base, an atomization air channel and an atomizer disposed inside;
    the water feed base comprises a water feed opening at top and a first outflow opening at bottom, and the first outflow opening is in communication with the water tank;
    the atomization water reservoir is provided with a water inlet so that water in the water tank enters the atomization water reservoir through the water inlet pipe under the action of the water suction pump; and
    the atomizer is in communication with the atomization water reservoir via an atomization opening, the atomization opening is disposed at the atomization water reservoir, water vapor generated by the atomizer enters the atomization air channel through an air inlet at the bottom of the atomization air channel and flows to outside along the atomization air channel.

2. The humidifier according to claim 1, wherein the water suction pump is connected to an end of the water inlet pipe, and the water suction pump is located in the water tank when the humidifier is assembled.

3. The humidifier according to claim 1, wherein the water suction pump is fixed on the machine base, one end of the water inlet pipe is connected to the water suction pump and the other end of the water inlet pipe is protruded into the water tank; and
    a water feed pipe is further comprised, one end of the water feed pipe is connected to the water suction pump and the other end of the water feed pipe is connected with the water inlet.

4. The humidifier according to claim 3, wherein the water feed pipe and the water inlet pipe are at the same side of the water suction pump.

5. The humidifier according to claim 1, wherein the water inlet pipe comprises a water suction branch pipe and a connection branch pipe, one end of the connection branch pipe is connected with a water suction pump, and the other end of the connection branch pipe is connected with the water suction branch pipe.

6. The humidifier according to claim 5, wherein the connection branch pipe and the water suction branch pipe are connected in an inserted manner.

7. The humidifier according to claim 1, wherein a water outlet in communication with the water tank is further disposed on the atomization water reservoir.

8. The humidifier according to claim 7, wherein in a vertical direction, a height of the water outlet is lower than a height of the water inlet.

9. The humidifier according to claim 7, wherein a third avoiding hole and a fourth avoiding hole corresponding to the water inlet and the water outlet respectively are disposed on the machine base, the third avoiding hole is used for the water inlet pipe to pass through, and the fourth avoiding hole communicates the water outlet with the water tank.

10. The humidifier according to claim 7, wherein the water outlet is at a corner of a main base and away from the water inlet; the main base has a flow guide pipe at a bottom of the water outlet, and a side surface at an outward-facing side of a bottom end of the flow guide pipe has a second outflow opening.

11. The humidifier according to claim 7, wherein a water retaining rib is surrounded around the water outlet.

12. The humidifier according to claim 1, wherein the machine base comprises a seat and a main base, and the seat is fixed at a lower portion of the main base;
    the main base comprises a housing and a partition plate integrally formed, and the partition plate is located in the housing and partitions the housing into upper and lower portions; the partition plate and the upper portion of the housing form the atomization water reservoir, and a reservoir bottom of the atomization water reservoir is the partition plate;
    the water feed base and the control base are disposed in parallel at an upper half of the main base, the atomization air channel is located between the water feed base and the control base, and the seat is fixed at a lower half of the main base;
    the partition plate and the seat have a first avoiding hole and a second avoiding hole, and the first outflow opening exactly faces the first avoiding hole and the second avoiding hole.

13. The humidifier according to claim 1, wherein the water inlet and the atomization opening are both at the bottom of the atomization water reservoir, and a flow guide groove is disposed between the water inlet and the atomization opening.

14. The humidifier according to claim 12, wherein in a vertical direction, the flow guide groove is inclined toward the atomization opening, and the position of the flow guide groove close to the atomization opening is presented as gradually widening in a direction toward the atomization opening.

15. The humidifier according to claim 1, wherein a high-level detector and a low-level detector are disposed in the atomization water reservoir.

16. The humidifier according to claim 15, wherein the high-level detector and the low-level detector are dry reed pipe.

17. The humidifier according to claim 1, wherein a disinfection lamp is disposed at the water inlet.

18. The humidifier according to claim 1, wherein the water feed base is inserted into the machine base and can be removed from the machine base.

19. The humidifier according to claim 12, wherein the water feed base is inserted into the upper part of the main base and can be disassembled from the upper part of the main base.

\* \* \* \* \*